US012717008B1

(12) United States Patent
Chen

(10) Patent No.: US 12,717,008 B1
(45) Date of Patent: Aug. 25, 2026

(54) LIDAR METHOD AND APPARATUS WITH IMPROVED SIGNAL-TO-NOISE RATIO

(71) Applicant: Marvell Asia Pte Ltd, Singapore (SG)

(72) Inventor: Chen Chen, San Jose, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 659 days.

(21) Appl. No.: 18/338,428

(22) Filed: Jun. 21, 2023

Related U.S. Application Data

(60) Provisional application No. 63/397,029, filed on Aug. 11, 2022.

(51) Int. Cl.
*G01S 7/4911* (2020.01)
*G01S 7/481* (2006.01)
*G01S 17/58* (2006.01)

(52) U.S. Cl.
CPC ........... *G01S 7/4911* (2013.01); *G01S 7/4815* (2013.01); *G01S 17/58* (2013.01)

(58) Field of Classification Search
CPC ....... G01S 17/58; G01S 7/4911; G01S 7/4815
See application file for complete search history.

(56) References Cited

U.S. PATENT DOCUMENTS 10,557,939 B2 2/2020 Campbell et al.
10,948,598 B1 * 3/2021 Prabhakar ............... G01S 7/499
11,231,500 B1 * 1/2022 Rezk ....................... G01S 17/26
11,320,522 B1 * 5/2022 Avci ...................... G01S 7/4911
11,372,105 B1 6/2022 Roxworthy et al.
11,378,667 B2 7/2022 Viswanatha et al.
2018/0231659 A1 * 8/2018 Campbell ............... G01S 17/88
2019/0257927 A1 * 8/2019 Yao ....................... G01S 7/4815
2020/0033124 A1 * 1/2020 Lee ....................... G01S 13/931
2020/0110161 A1 * 4/2020 Talty ..................... G01S 7/4817
2021/0179115 A1 * 6/2021 Satti ...................... G01S 19/393
2023/0050706 A1 * 2/2023 LeVasseur ......... G01C 21/3691
2023/0260078 A1 * 8/2023 Longman .................. G06T 7/32
348/148

OTHER PUBLICATIONS

Banzhaf, S., et al., "Phase-Code-Based Modulation for Coherent Lidar," *IEEE Transactions on Vehicular Technology,* 70(10):9886-97 (2021).

* cited by examiner

*Primary Examiner* — Md N Haque

(57) ABSTRACT

Lidar apparatus includes a light source having a source frequency, an electrical signal generator configured to generate a digitally-coded electrical signal, a modulator configured to impress the digitally-coded signal onto a light beam emitted by the light source, and to convert the digitally-coded output beam of the light source into a multi-dimensional modulated output beam, transmitter optics configured to propagate the multi-dimensional beam toward a target, receiver optics configured to receive the multi-dimensional beam as reflected by the target, an optical demodulator configured to demodulate the reflected multi-dimensional beam, electro-optical conversion circuitry configured to output an electrical signal representing the received reflected multi-dimensional beam, and digital signal processing circuitry configured to compare the electrical signal representing the received reflected multi-dimensional beam to the digitally-coded signal to determine at least one of (a) range, and (b) velocity, of the target.

18 Claims, 7 Drawing Sheets

LIDAR METHOD AND APPARATUS WITH IMPROVED SIGNAL-TO-NOISE RATIO

CROSS REFERENCE TO RELATED APPLICATION

This disclosure claims the benefit of U.S. Provisional Patent Application No. 63/397,029, filed Aug. 11, 2022, which is hereby incorporated by reference herein in its entirety.

FIELD OF USE

This disclosure relates to improving signal-to-noise ratio in lidar. More particularly, this disclosure relates to increasing signal-to-noise ratio by using multi-dimensional modulation.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Lidar may be used to measure distance (i.e., range) to, and velocity of, a remote object, by reflecting light—typically from a laser in an invisible wavelength such as infrared—off the remote object, and measuring characteristics (e.g., round-trip delay, or frequency shift) of the returned light. Lidar is becoming common, for example, in automotive applications such as driver-assist technologies (e.g., for collision avoidance or lane-keeping) as well as autonomous vehicle technologies.

One concern in lidar applications is achieving a sufficient signal-to-noise ratio (SNR) at the detector, because the detector aperture size may be relatively small. For example, in automotive applications the aperture size may be only a few square centimeters, and for detection of an object that is several hundred meters (e.g., 300 m) away, the channel loss with a small aperture (e.g., a few square centimeters) may be at least 100 dB.

SUMMARY

In accordance with implementations of the subject matter of this disclosure, lidar apparatus includes a light source having a source frequency, an electrical signal generator configured to generate a digitally-coded electrical signal, a modulator configured to impress the digitally-coded electrical signal onto a light beam emitted by the light source, and to convert the digitally-coded output beam of the light source into a multi-dimensional modulated output beam, transmitter optics configured to propagate the multi-dimensional modulated output beam toward a target, receiver optics configured to receive the multi-dimensional modulated output beam as reflected by the target, an optical demodulator configured to demodulate the reflected multi-dimensional modulated output beam, electro-optical conversion circuitry configured to output an electrical signal representing the received reflected multi-dimensional modulated output beam, and digital signal processing circuitry configured to compare the electrical signal representing the received reflected multi-dimensional modulated output beam to the digitally-coded signal to determine at least one of (a) range, and (b) velocity, of the target.

In a first implementation of such lidar apparatus, the modulator may be configured to convert the digitally-coded output beam into an in-phase beam component and a quadrature-phase beam component.

In a second implementation of such lidar apparatus, the modulator may be configured to convert the digitally-coded output beam into a first polarized beam component having a first polarization, and a second polarized beam component beam having a second polarization orthogonal to the first polarization.

In a third implementation of such lidar apparatus, the modulator may be configured to convert the digitally-coded output beam into a first in-phase beam component having a first polarization, a first quadrature-phase beam component having the first polarization, a second in-phase beam component having a second polarization orthogonal to the first polarization, and a second quadrature phase beam component having the second polarization.

In a fourth implementation of such lidar apparatus, the digital signal processing circuitry may be configured to compare the electrical signal to the digitally coded signal by correlation.

In a fifth implementation of such lidar apparatus, the electrical signal may include a plurality of respective portions, each respective portion representing a respective dimension of the reflected multi-dimensional modulated output beam, and the digital signal processing circuitry may be configured to respectively compare each respective portion of the electrical signal to the digitally-coded signal and to output a respective comparison signal for each respective portion of the electrical signal.

According to a first aspect of that fifth implementation, the digital signal processing circuitry may be further configured to combine the respective comparison signals to determine the at least one of (a) range, and (b) velocity, of the target.

In a first instance of that first aspect, the digital signal processing circuitry may be configured to combine the respective comparison signals by summation.

In a sixth implementation of such lidar apparatus, the light source may include a plurality of light sources, each light source in the plurality of light sources having a different wavelength.

In a seventh implementation of such lidar apparatus, the optical demodulator may include a local oscillator light source and a 90-degree optical hybrid.

In an eighth implementation of such lidar apparatus, the electrical signal generator comprises phase-coded-modulation circuitry.

According to a first aspect of that eighth implementation, the digital signal processing circuitry is configured to determine the velocity of the target by forming a first complex-valued signal from a plurality of dimensions of the received reflected multi-dimensional modulated output beam, raising the first complex-valued signal to the fourth power to yield a second complex-valued signal, generating a power spectrum of the second complex valued signal, identifying a peak frequency of the power spectrum, and calculating the velocity from a difference between the source frequency and the peak frequency.

In accordance with implementations of the subject matter of this disclosure, a light detection and ranging method includes generating a digitally-coded electrical signal and impressing the digitally-coded electrical signal onto a light beam emitted by a light source, converting the digitally-coded output beam of the light source into a multi-dimensional modulated output beam, propagating the multi-dimensional modulated output beam toward a target, receiving the multi-dimensional modulated output beam as reflected by the target, demodulating the reflected multi-dimensional modulated output beam, electro-optically converting the received reflected multi-dimensional modulated output beam and outputting an electrical signal representing the received reflected multi-dimensional modulated output beam, and comparing the electrical signal representing the received reflected multi-dimensional modulated output beam to the digitally-coded electrical signal to determine at least one of (a) range to, and (b) velocity of, the target.

In a first implementation of such a method, converting the digitally-coded output beam of the light source into a multi-dimensional modulated output beam may include converting the digitally-coded output beam into an in-phase beam component and a quadrature-phase beam component.

In a second implementation of such a method, converting the digitally-coded output beam of the light source into a multi-dimensional modulated output beam may include converting the digitally-coded output beam into a first polarized beam component having a first polarization, and a second polarized beam component beam having a second polarization orthogonal to the first polarization.

In a third implementation of such a method, converting the digitally-coded output beam of the light source into a multi-dimensional modulated output beam may include converting the digitally-coded output beam into a first in-phase beam component having a first polarization, a first quadrature-phase beam component having the first polarization, a second in-phase beam component having a second polarization orthogonal to the first polarization, and a second quadrature phase beam component having the second polarization.

In a fourth implementation of such a method, comparing the electrical signal representing the received reflected multi-dimensional modulated output beam to the digitally-coded electrical signal may include comparing the electrical signal to the digitally-coded electrical signal by correlation.

In a fifth implementation of such a method, when the electrical signal includes a plurality of respective portions, each respective portion representing a respective dimension of the reflected multi-dimensional modulated output beam, comparing the electrical signal representing the received reflected multi-dimensional modulated output beam to the digitally-coded electrical signal may include respectively comparing each respective portion of the electrical signal to the digitally-coded electrical signal and outputting a respective comparison signal for each respective portion of the electrical signal.

According to a first aspect of that fifth implementation, comparing the electrical signal representing the received reflected multi-dimensional modulated output beam to the digitally-coded electrical signal may further include combining the respective comparison signals to determine the at least one of (a) range to, and (b) velocity of, the target.

In a first instance of that first aspect, combining the respective comparison signals may include combining the respective comparison signals by summation.

In a sixth implementation of such a method, generating a digitally-coded electrical signal may include generating a phase-code-modulated signal.

According to a first aspect of that sixth implementation determining the velocity of the target may include forming a first complex-valued signal from a plurality of dimensions of the received reflected multi-dimensional modulated output beam, raising the first complex-valued signal to the fourth power to yield a second complex-valued signal, generating a power spectrum of the second complex valued signal, identifying a peak frequency of the power spectrum, and calculating the velocity from a difference between the source frequency and the peak frequency.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
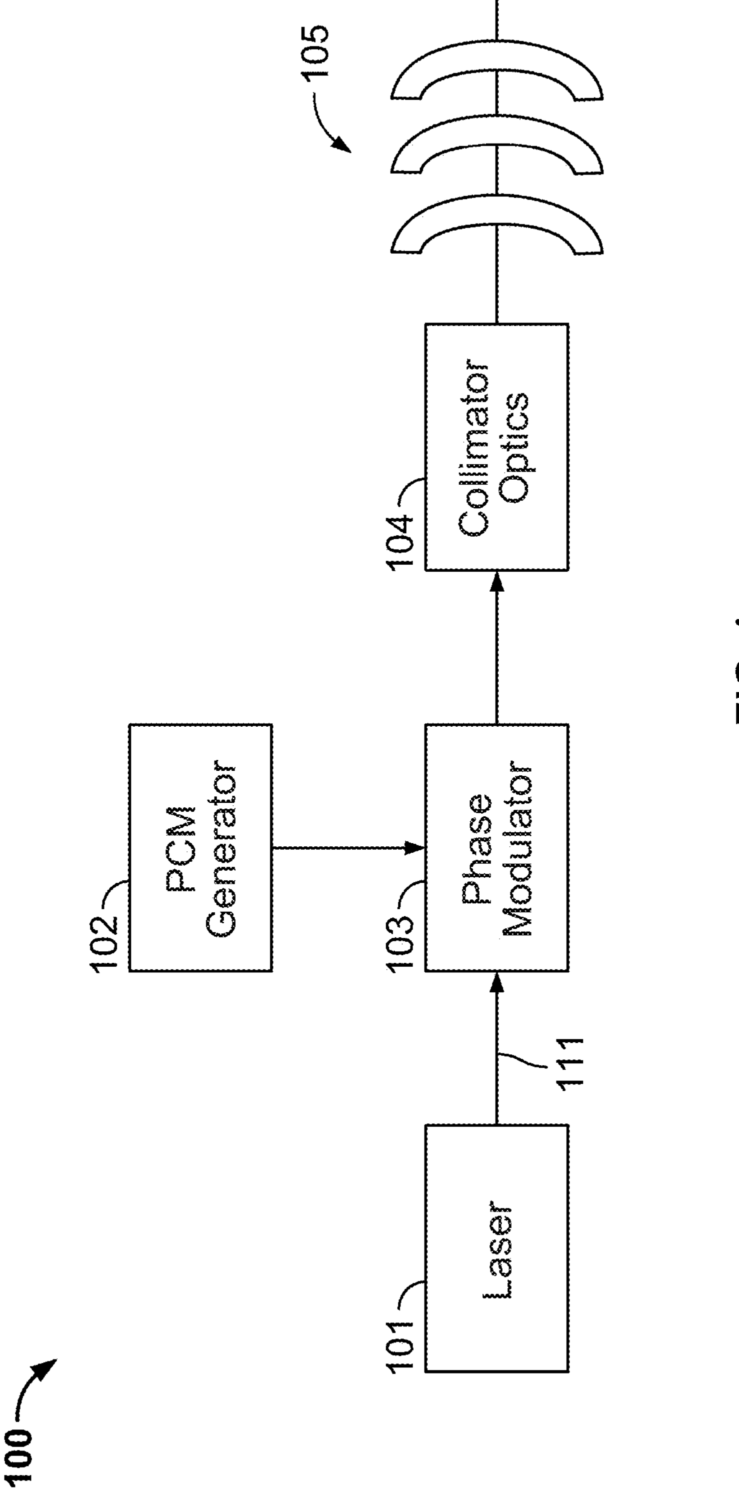
FIG. 1 shows the transmit path of a lidar device incorporating implementations of the subject matter of this disclosure.

As noted above, one concern in lidar applications is achieving a sufficient signal-to-noise ratio (SNR) at the detector, because the detector aperture size may be relatively small. For example, in automotive applications the aperture size may be only a few square centimeters, and for detection of an object that is several hundred meters (e.g., 300 m) away, the channel loss with a small aperture (e.g., a few square centimeters) may be at least 100 dB. However, if SNR could be improved, then comparable performance could be achieved at lower cost (because a smaller aperture could be used, or because other requirements of the detector may be relaxed) or, alternatively, improved performance (e.g., faster measurement time, or extended detection range with the same measurement time) could be achieved without increasing cost.

Therefore, in accordance with implementations of the subject matter of this disclosure, lidar circuitry with improved receiver SNR may be achieved in a coherent lidar by using multiple signal streams, which include phase information, and whose signals may be combined. This may be done efficiently in implementations of the subject matter of this disclosure by modulating a single source sequence—e.g., a pseudo-random bit sequence (PRBS)—using a modulation technique that can provide a multidimensional output, producing multiple separate streams for transmission.

For example, phase-coded modulation (PCM) may be used to create a digitally-coded PRBS output signal that includes phase information and can be processed through a phase modulator, or an I-Q complex modulator, to create a two-dimensional output with two separate data streams based on the same input sequence. Other modulation techniques that contain phase information may also be used to create two or more output streams. For example, quadrature-amplitude modulation may be used to provide signals including both amplitude and phase information. Moreover, each output stream, once converted to an optical beam, may be passed through a polarization filter, which could be included in the phase modulator (e.g., a dual-polarization phase modulator or a dual-polarization I-Q complex modulator), to provide two orthogonal (X and Y) polarizations, each of which may have an in-phase component and a quadrature-phase component, which provides a four-dimensional output. If dual polarization is used together with phase modulation, the fourth output could be discarded to provide a three-dimensional output, depending on the degree of SNR improvement that is desired.

The multiple streams provided in the multi-dimensional signal are transmitted optically toward the target object, which reflects the streams back to the aperture of a receiver having an optical detector. Specifically, the receiver may include a 90-degree optical hybrid coupler and transformer, a balanced photodetector, a transimpedance amplifier, and an analog-to-digital converter (ADC), arranged similarly to a coherent optical communications receiver. Such a receiver has more than enough bandwidth for lidar, which operates at lower rates than coherent optical communications.

Digital signal processing circuitry in the receiver, in accordance with implementations of the subject matter of this disclosure, compares the received signal, reconverted to an electrical signal, with the transmitted signal to provide an output signal. In some implementations, the comparison may include correlation of the received signals (e.g., two, three or four received signals as described above) with the transmitted signal to provide the output signal.

One straightforward implementation simply sums the two, three or four received signals. According to one variation, all transmitted signals may be summed and all received signals may be summed, and then a correlation may be performed between the two sums, and a peak of the correlation results may be identified. According to a second variation, separate correlations may be performed on each transmit and received signal pair, and then the correlation results may be summed and a peak may be identified in the summed correlation results.

In another implementation, instead of a summation operation or operations, an averaging operation or operations may be performed. As in the summation-based implementation, according to one variation, all transmitted signals may be averaged and all received signals may be averaged, and then a correlation may be performed between the two averages (i.e., means), and a peak of the correlation results may be identified. According to a second variation, separate correlations may be performed on each transmit and received signal pair, and then the correlation results may be averaged and a peak may be identified in the averaged correlation results.

The SNR improvement may be proportional to the number of dimensions (i.e., received signal streams). For example, in some implementations, it has been observed that using a four-dimensional signal increases SNR by 6 dB compared to a one-dimensional signal, meaning the difference between a detectable signal and a signal under the noise threshold.

The subject matter of this disclosure may be better understood by reference to FIGS. 1-7.

The basic structure 100 of the transmit path of a lidar device incorporating implementations of the subject matter of this disclosure is shown in FIG. 1. Laser 101 is the source of laser beam 111 for transmission. Normally, laser 101 may emit infrared laser light, although visible-light lasers may be used in some implementations. PCM generator 102 may be used to generate a PCM-coded electrical signal. Phase modulator 103 may be used to create the multiple signal streams for transmission as discussed above, and to impress the multiple signal streams onto the laser beam 111 for transmission via collimator optics 104 into free space as waves or pulses 105. Particular sample implementations are described below.

Figure 2:
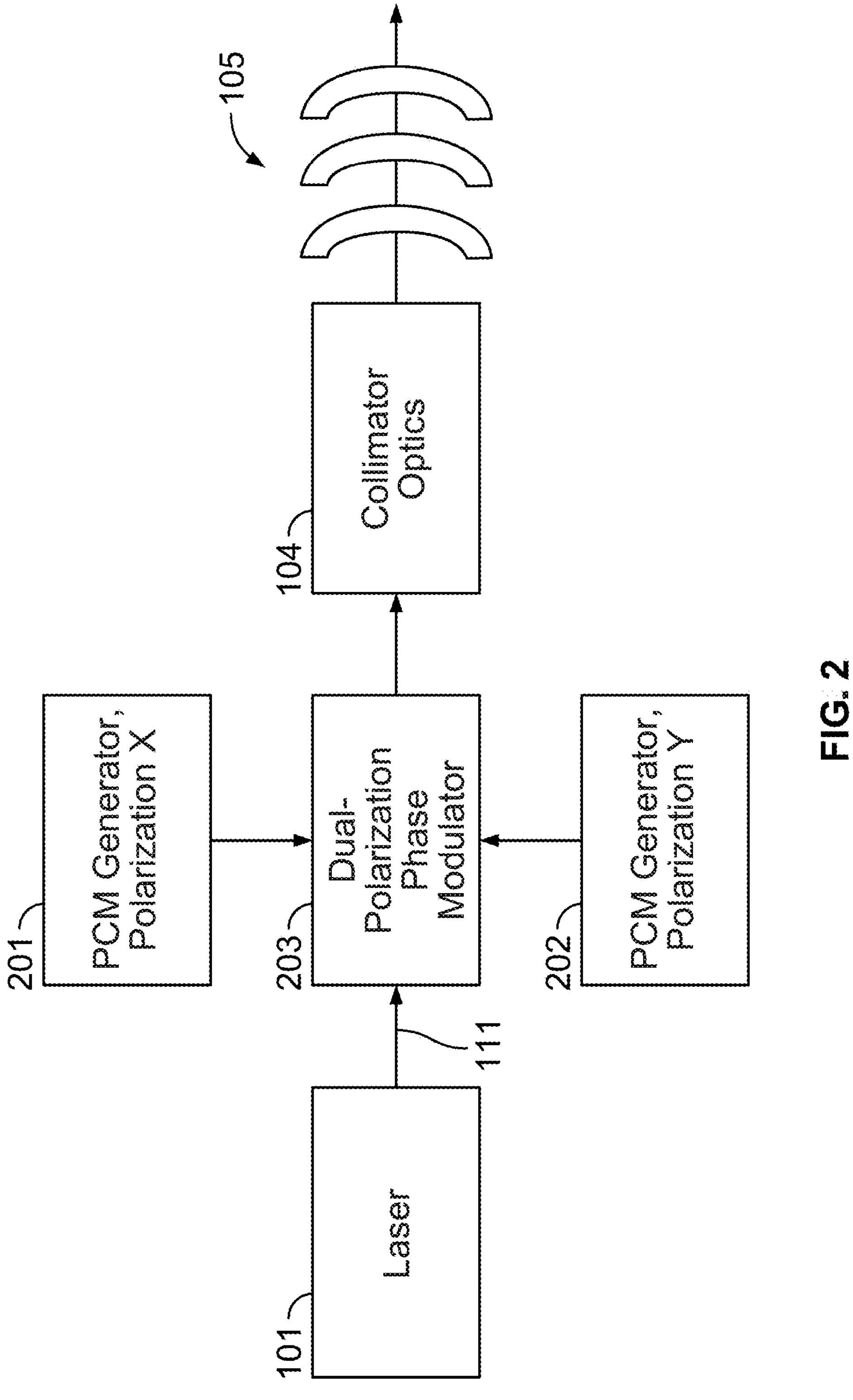
FIG. 2 shows a dual-polarization implementation of the transmit path of FIG. 1.

As shown in FIG. 2, in dual-polarization implementations 200 of the subject matter of this disclosure, PCM generator 102 and phase modulator 103 collectively may include an X-polarization PCM generator 201 and a Y-polarization PCM generator 202. To accommodate the dual polarization, phase modulator 103 may be implemented as a dual-polarization phase modulator 203, capable of impressing two orthogonally-polarized data streams onto laser beam 111.

Figure 3:
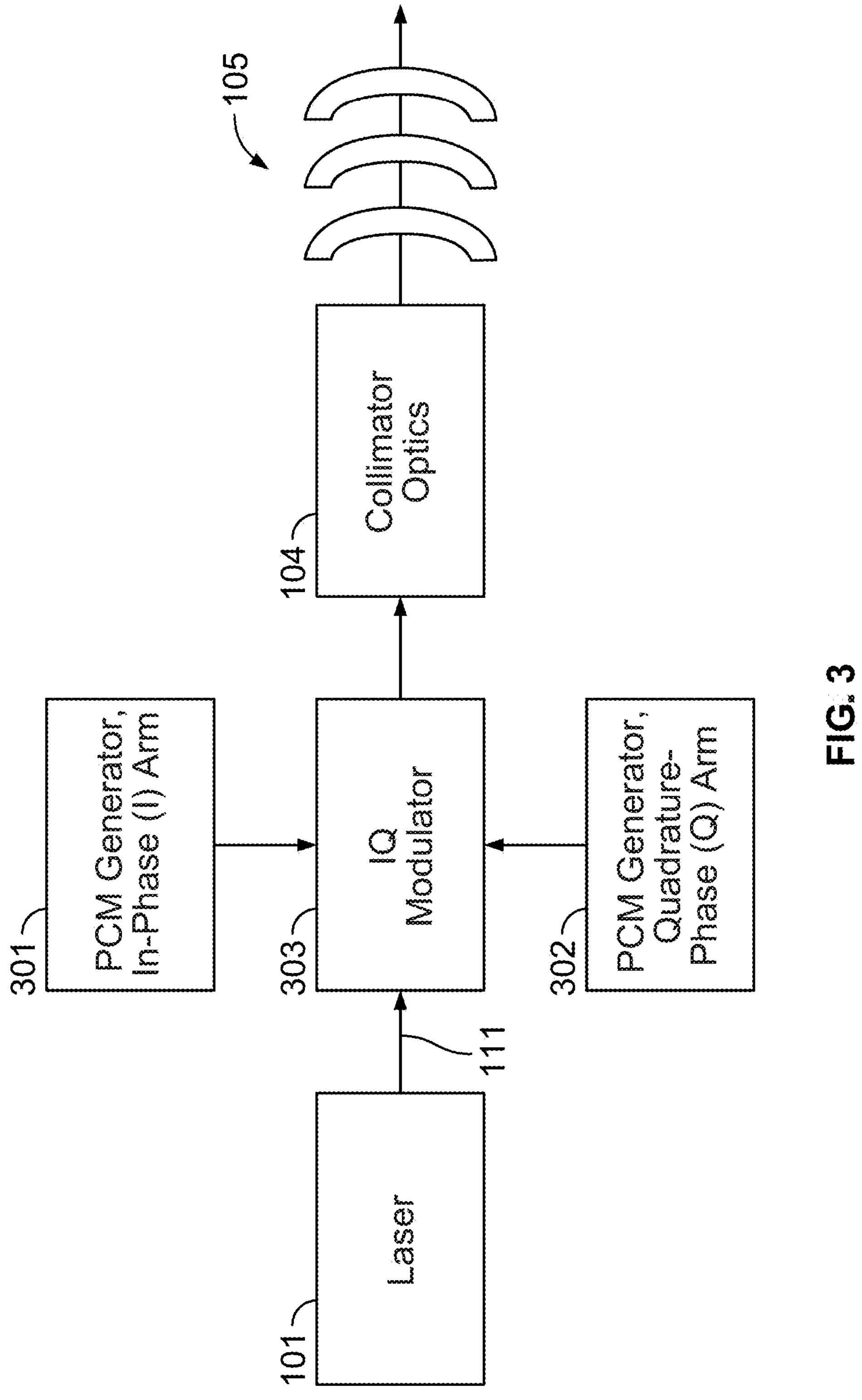
FIG. 3 shows another implementation of the transmit path of FIG. 1.

As an alternative to the use of dual polarization to create two data streams for transmission, FIG. 3 shows an implementation 300 in which phase modulator 103 is implemented as an I-Q modulator 303, capable of separately impressing an in-phase signal and a quadrature-phase signal onto laser beam 111. In such an implementation, PCM generator 102 may include an in-phase PCM generator 301 and a quadrature-phase PCM generator 302.

Figure 4:
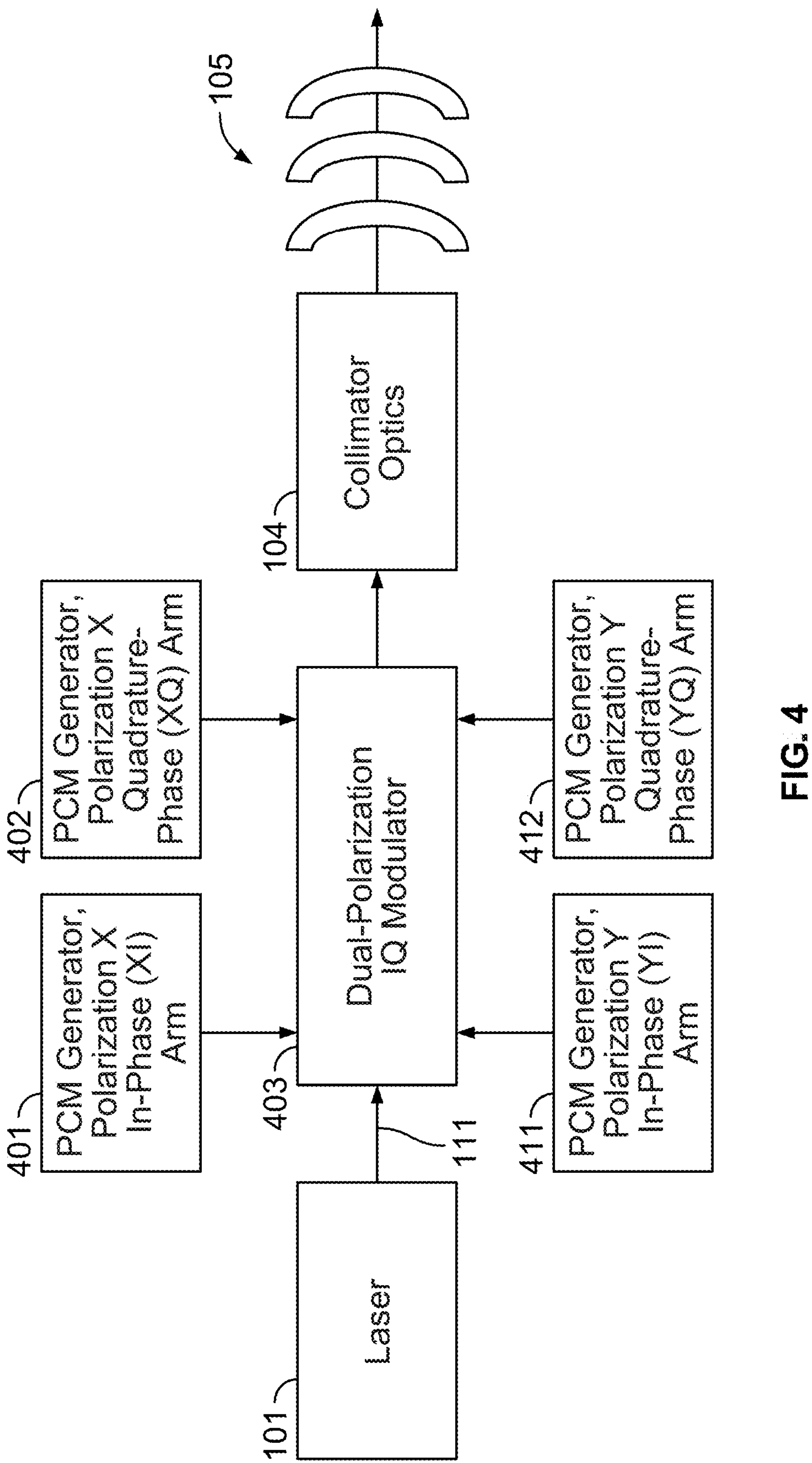
FIG. 4 shows yet another implementation of the transmit path of FIG. 1.

Whereas the implementations of FIGS. 2 and 3 provide a two-dimensional signal—i.e., a signal having two separate data streams—implementations according to FIG. 4 provide a four-dimensional signal. In such an implementation 400, phase modulator 103 may be implemented as a dual-polarization I-Q modulator 303, capable of separately impressing an X-polarized in-phase signal, an X-polarized quadrature-phase signal, a Y-polarized in-phase signal, and a Y-polarized quadrature-phase signal onto laser beam 111. Those signals are generated by implementing PCM generator 102 as an X-polarized in-phase PCM generator 401, an X-polarized quadrature-phase PCM generator 402, a Y-polarized in-phase PCM generator 411, and a Y-polarized quadrature-phase PCM generator 412. In a similar implementation (not shown), four independent pulse-amplitude modulation (PAM) streams may be combined to create a quadrature-amplitude modulation signal, which includes both phase and amplitude information. Regardless of the type of modulation, in a four-dimensional implementation, as noted above, one of the data streams may be discarded, providing, in such cases, a three-dimensional signal.

Figure 5:
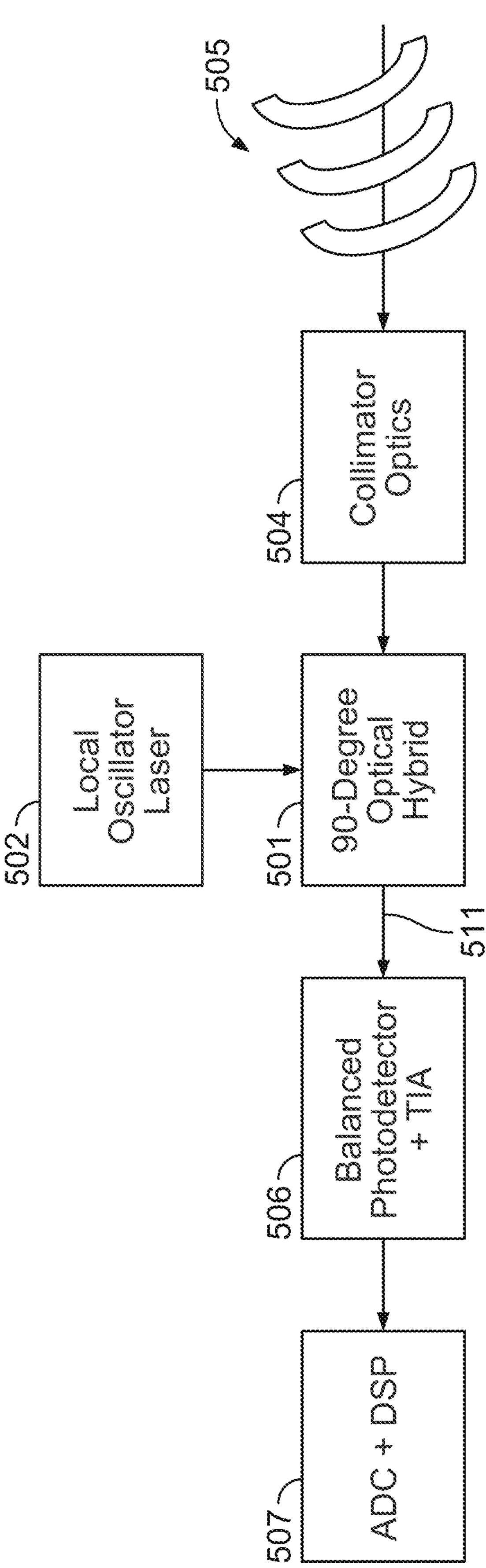
FIG. 5 shows the receive path of a lidar device incorporating implementations of the subject matter of this disclosure.
Figure 6:
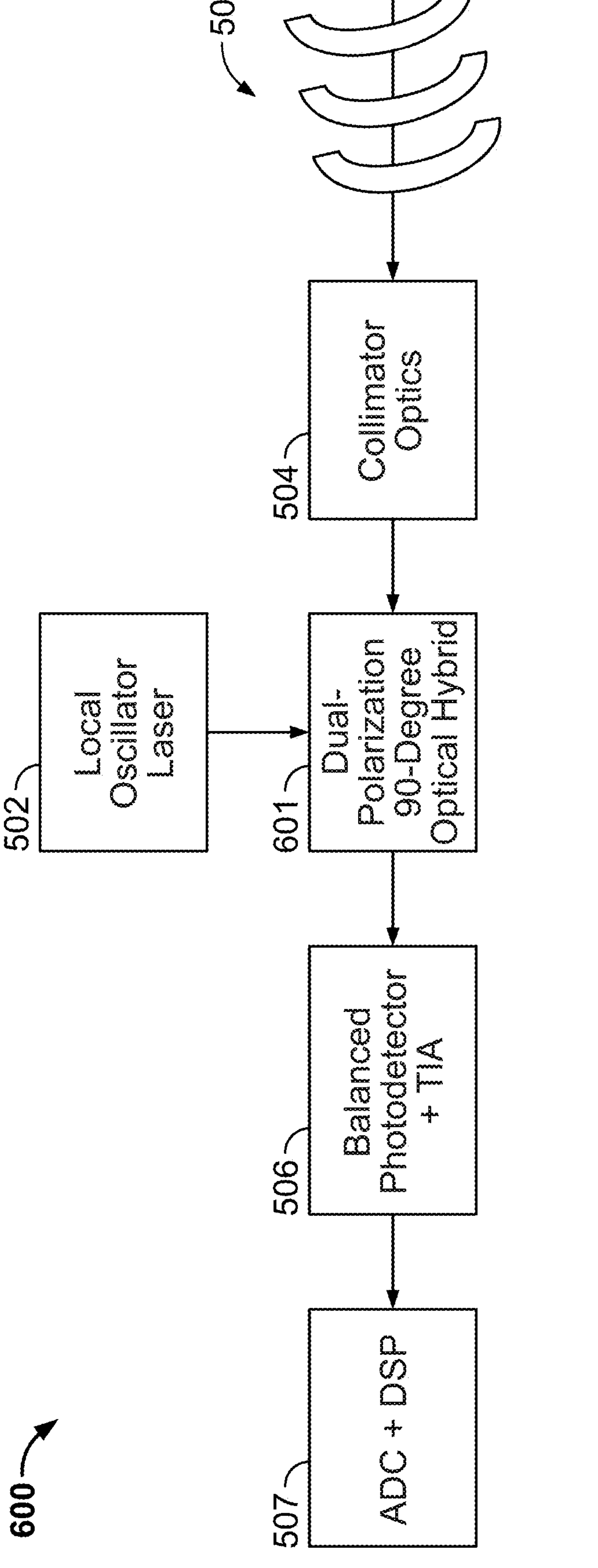
FIG. 6 shows one implementation of the receive path of FIG. 5.

Waves or pulses 105 propagate to a target (a remote object whose distance and/or velocity are to be measured) and are reflected back as waves or pulses 505. As seen in FIG. 5, an implementation 500 of a coherent lidar receiver according to the subject matter of this disclosure may include collimator optics 504, which feeds the received pulses 505 into a 90-degree optical hybrid coupler and transformer 501 along with the output of local laser oscillator 502. Local laser oscillator 502 includes a laser with a nominally identical frequency as laser source 101, to beat against received return pulses 505 in an optical heterodyne detection operation in 90-degree optical hybrid coupler and transformer 501, which creates output pulses 511 in multiple streams (reflecting the original transmitted phase and polarization).

Output pulses 511 of the optical heterodyne detection operation are detected and amplified by balanced photodetector and transimpedance amplifier 506. The detected pulses, still in different streams, are then digitized and processed in accordance with the subject matter of this disclosure in analog-to-digital converter/digital signal processor 507. As discussed above, the digital signal processing includes combining the different streams to increase the SNR. The combining may include addition of the different streams at the receiver which, for N streams each having the same SNR, provides an improvement of SNR by a factor of N (i.e., the SNR is multiplied by N).

The characteristics of 90-degree optical hybrid coupler and transformer 501 may vary depending on the nature of PCM generator 102 and phase modulator 103 that produced the transmitted signal pulses 105. Thus, in implementation 600 of FIG. 6, where the received pulses 505 are reflections of pulses 105 produced by X-polarization PCM generator 201 and a Y-polarization PCM generator 202, along with a dual-polarization phase modulator 203, a dual-polarization 90-degree optical hybrid coupler and transformer 601 may be used. In other implementations (not shown)—e.g., where I-Q modulation is used instead of or in addition to dual polarization—the 90-degree optical hybrid coupler and transformer may be an I-Q modulation 90-degree optical hybrid coupler and transformer or a dual-polarization I-Q modulation 90-degree optical hybrid coupler and transformer.

In PCM implementations, in each quadrature (I or Q), and in either of the two polarizations (X and Y), a PCM sequence can be a simple binary sequence or other simple sequence. However, almost any sequence can be used including more complicated multilevel sequences.

The description above assumes that a single wavelength of light is used. With one wavelength, either two or four streams may be derived from any one coded sequence (whether using PCM or a different modulation) as described above. However, the number of streams may be multiplied further by using additional wavelengths, further improving SNR.

Once a lidar signal with sufficient SNR has been received and demodulated, it may be used to determine, e.g., range (i.e., distance) to, or velocity (i.e., speed) of, a target.

One method for determining range is to perform a correlation operation between the known transmitted sequences (e.g., PCM sequences) and the returned sequences. The correlation peak indicates the round-trip time delay between the transmitted and received sequences, allowing calculation of the range, R:

$$R=c\times \mathrm{delay}_{RT}/2,$$

where $\mathrm{delay}_{RT}$ is the round-trip delay, and c is the speed of light.

Velocity may be determined, as is known, from the Doppler frequency shift of the received signal relative to the transmitted signal. In accordance with coherent lidar implementations of the subject matter of this disclosure, the Doppler frequency shift may be determined using the same received sequences as those used for range measurement, which avoids the need to capture new data, and enables a faster measurement, as follows:

First, the received I and Q quadrature phase components (within either or both of two polarizations) may be combined to form a first complex-valued signal, A.

Second, assuming that quadrature phase-shift keying (QPSK) is in use, the complex-valued signal A is raised to the fourth power ($A^4$) to form a second complex-valued signal B in which the four QPSK phases are collapsed to a single phase.

Third, the power spectrum of signal B may be analyzed, such as by performing a Fast Fourier Transform (FFT) analysis, to detect the peak of the power spectrum.

The frequency difference between the transmitted frequency ($f_0$) and the frequency ($f_p$) of the peak of the power spectrum is the frequency offset ($\mathrm{offset}_f$). The magnitude |V| of the velocity may be calculated as:

$$|V|=|\mathrm{offset}_f|\times\lambda$$

where λ is the transmitted laser wavelength. This also may be written as:

$$V=|f_0-f_p|\times(c/f_0)=(|f_0-f_p|/f_0)\times c$$

The sign is based on the convention that is adopted as to whether positive V means moving away (lower frequency) or moving closer (higher frequency).

The frequency offset can reduce the correlation between the transmitted signal and the received signal, which may adversely affect the validity or accuracy of the range determination. Therefore, if the velocity determination is performed before the range determination, then having determined the frequency offset, $\mathrm{offset}_f$, one may remove the frequency offset before performing range determination.

Figure 7:
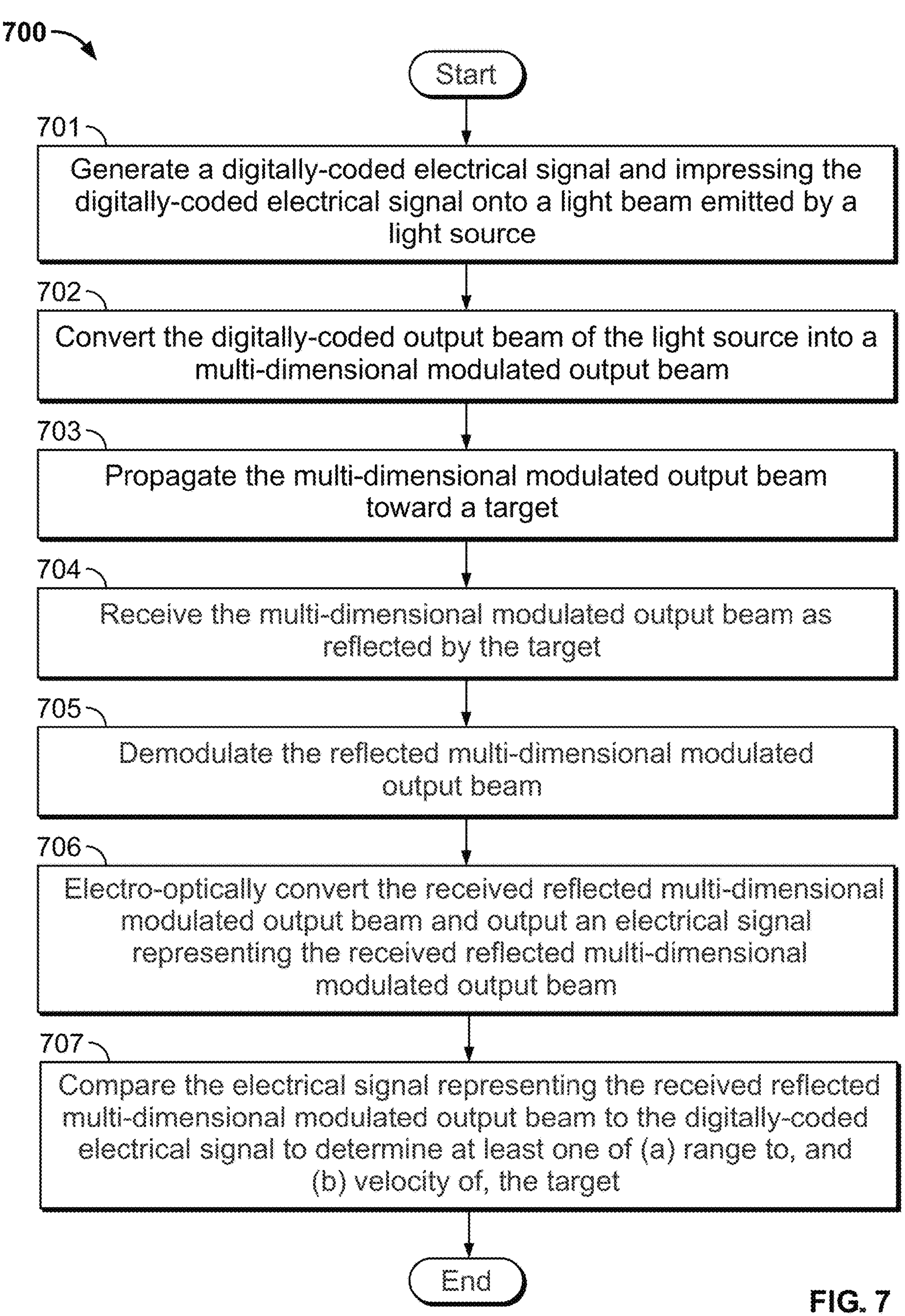
FIG. 7 is a flow diagram illustrating implementations of a method in accordance with the subject matter of this disclosure.

FIG. 7 is a flow diagram illustrating a method 700 in accordance with implementations of the subject matter of this disclosure for light detection and ranging. Method 700 begins at 701 where a digitally-coded electrical signal is generated and impressed onto a light beam emitted by a light source. At 702, the digitally-coded output beam of the light source is converted into a multi-dimensional modulated output beam. At 703, the multi-dimensional modulated output beam is propagated toward a target. At 704, the multi-dimensional modulated output beam as reflected by the target is received. At 705, the reflected multi-dimensional modulated output beam is demodulated. At 706, the received reflected multi-dimensional modulated output beam is electro-optically converted, and an electrical signal representing the received reflected multi-dimensional modulated output beam is outputted. At 707, the electrical signal representing the received reflected multi-dimensional modulated output beam is compared to the digitally-coded electrical signal to determine at least one of (a) range to, and (b) velocity of, the target. Method 700 then ends.

Thus it is seen that a method apparatus for improving signal-to-noise ratio in lidar, particularly by using multi-dimensional modulation, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. Lidar apparatus comprising:

a light source having a source frequency;

an electrical signal generator configured to generate a digitally-coded electrical signal;

a modulator configured to impress the digitally-coded electrical signal onto a light beam emitted by the light source to generate a digitally-coded output beam, and to convert the digitally-coded output beam of the light source into a multi-dimensional modulated output beam;

transmitter optics configured to propagate the multi-dimensional modulated output beam toward a target;

receiver optics configured to receive the multi-dimensional modulated output beam as reflected by the target;

an optical demodulator configured to demodulate the reflected multi-dimensional modulated output beam;

electro-optical conversion circuitry configured to output an electrical signal representing the reflected multi-dimensional modulated output beam; and digital signal processing circuitry configured to compare the electrical signal representing the reflected multi-dimensional modulated output beam to the digitally-coded electrical signal to determine at least one of (a) range, and (b) velocity, of the target, wherein the electrical signal comprises a plurality of respective portions, each respective portion representing a respective dimension of the reflected multi-dimensional modulated output beam; and the digital signal processing circuitry is configured to respectively compare each respective portion of the electrical signal to the digitally-coded electrical signal and to output a respective comparison signal for each respective portion of the electrical signal.

2. The lidar apparatus of claim 1 wherein the modulator is configured to convert the digitally-coded output beam into an in-phase beam component and a quadrature-phase beam component.

3. The lidar apparatus of claim 1 wherein the modulator is configured to convert the digitally-coded output beam into a first polarized beam component having a first polarization, and a second polarized beam component beam having a second polarization orthogonal to the first polarization.

4. The lidar apparatus of claim 1 wherein the modulator is configured to convert the digitally-coded output beam into a first in-phase beam component having a first polarization, a first quadrature-phase beam component having the first polarization, a second in-phase beam component having a second polarization orthogonal to the first polarization, and a second quadrature phase beam component having the second polarization.

5. The lidar apparatus of claim 1 wherein the digital signal processing circuitry is configured to compare the electrical signal to the digitally-coded electrical signal by correlation.

6. The lidar apparatus of claim 1 wherein the digital signal processing circuitry is further configured to combine the respective comparison signals to determine the at least one of (a) range, and (b) velocity, of the target.

7. The lidar apparatus of claim 6 wherein the digital signal processing circuitry is configured to combine the respective comparison signals by summation.

8. The lidar apparatus of claim 1 wherein the light source comprises a plurality of light sources, each light source in the plurality of light sources having a different wavelength.

9. The lidar apparatus of claim 1 wherein the optical demodulator comprises a local oscillator light source and a 90-degree optical hybrid.

10. Lidar apparatus comprising:

a light source having a source frequency;

an electrical signal generator configured to generate a digitally-coded electrical signal;

a modulator configured to impress the digitally-coded electrical signal onto a light beam emitted by the light source to generate a digitally-coded output beam, and to convert the digitally-coded output beam of the light source into a multi-dimensional modulated output beam;

transmitter optics configured to propagate the multi-dimensional modulated output beam toward a target;

receiver optics configured to receive the multi-dimensional modulated output beam as reflected by the target;

an optical demodulator configured to demodulate the reflected multi-dimensional modulated output beam;

electro-optical conversion circuitry configured to output an electrical signal representing the reflected multi-dimensional modulated output beam; and digital signal processing circuitry configured to compare the electrical signal representing the reflected multi-dimensional modulated output beam to the digitally-coded electrical signal to determine at least one of (a) range, and (b) velocity, of the target, wherein the electrical signal generator comprises phase-coded-modulation circuitry, and wherein the digital signal processing circuitry is configured to determine the velocity of the target by:

forming a first complex-valued signal from a plurality of dimensions of the reflected multi-dimensional modulated output beam;

raising the first complex-valued signal to the fourth power to yield a second complex-valued signal;

generating a power spectrum of the second complex-valued signal;

identifying a peak frequency of the power spectrum; and calculating the velocity from a difference between the source frequency and the peak frequency.

11. A light detection and ranging method comprising:

generating a digitally-coded electrical signal and impressing the digitally-coded electrical signal onto a light beam emitted by a light source having a source frequency to generate a digitally-coded output beam;

converting the digitally-coded output beam of the light source into a multi-dimensional modulated output beam;

propagating the multi-dimensional modulated output beam toward a target;

receiving the multi-dimensional modulated output beam as reflected by the target;

demodulating the reflected multi-dimensional modulated output beam;

electro-optically converting the reflected multi-dimensional modulated output beam and outputting an electrical signal representing the reflected multi-dimensional modulated output beam; and comparing the electrical signal representing the reflected multi-dimensional modulated output beam to the digitally-coded electrical signal to determine at least one of (a) range to, and (b) velocity of, the target, wherein, when the electrical signal comprises a plurality of respective portions, each respective portion representing a respective dimension of the reflected multi-dimensional modulated output beam; and comparing the electrical signal representing the reflected multi-dimensional modulated output beam to the digitally-coded electrical signal comprises respectively comparing each respective portion of the electrical signal to the digitally-coded electrical signal and outputting a respective comparison signal for each respective portion of the electrical signal.

12. The light detection and ranging method of claim 11 wherein converting the digitally-coded output beam of the light source into a multi-dimensional modulated output beam comprises converting the digitally-coded output beam into an in-phase beam component and a quadrature-phase beam component.

13. The light detection and ranging method of claim 11 wherein converting the digitally-coded output beam of the light source into a multi-dimensional modulated output beam comprises converting the digitally-coded output beam into a first polarized beam component having a first polarization, and a second polarized beam component beam having a second polarization orthogonal to the first polarization.

14. The light detection and ranging method of claim 11 wherein converting the digitally-coded output beam of the light source into a multi-dimensional modulated output beam comprises converting the digitally-coded output beam into a first in-phase beam component having a first polarization, a first quadrature-phase beam component having the first polarization, a second in-phase beam component having a second polarization orthogonal to the first polarization, and a second quadrature phase beam component having the second polarization.

15. The light detection and ranging method of claim 11 wherein comparing the electrical signal representing the reflected multi-dimensional modulated output beam to the digitally-coded electrical signal comprises comparing the electrical signal to the digitally-coded electrical signal by correlation.

16. The light detection and ranging method of claim 11 wherein comparing the electrical signal representing the reflected multi-dimensional modulated output beam to the digitally-coded electrical signal further comprises combining the respective comparison signals to determine the at least one of (a) range to, and (b) velocity of, the target.

17. The light detection and ranging method of claim 16 wherein combining the respective comparison signals comprises combining the respective comparison signals by summation.

18. A light detection and ranging method comprising:

generating a digitally-coded electrical signal and impressing the digitally-coded electrical signal onto a light beam emitted by a light source having a source frequency to generate a digitally-coded output beam;

converting the digitally-coded output beam of the light source into a multi-dimensional modulated output beam;

propagating the multi-dimensional modulated output beam toward a target;

receiving the multi-dimensional modulated output beam as reflected by the target;

demodulating the reflected multi-dimensional modulated output beam;

electro-optically converting the reflected multi-dimensional modulated output beam and outputting an electrical signal representing the reflected multi-dimensional modulated output beam; and comparing the electrical signal representing the reflected multi-dimensional modulated output beam to the digitally-coded electrical signal to determine at least one of (a) range to, and (b) velocity of, the target, wherein generating a digitally-coded electrical signal comprises generating a phase-code-modulated signal, and wherein determining the velocity of the target comprises:

forming a first complex-valued signal from a plurality of dimensions of the reflected multi-dimensional modulated output beam; raising the first complex-valued signal to the fourth power to yield a second complex-valued signal; generating a power spectrum of the second complex-valued signal; identifying a peak frequency of the power spectrum; and calculating the velocity from a difference between the source frequency and the peak frequency.

* * * * *